United States Patent Office 3,244,676
Patented Apr. 5, 1966

3,244,676
COPOLYMERS OF DIALKENYL SULFONE AND ETHYLENICALLY UNSATURATED MONOMERS
Ellis K. Fields, Chicago, Ill., assignor to Standard Oil Company, Chicago, Ill., a corporation of Indiana
No Drawing. Filed Dec. 30, 1960, Ser. No. 79,568
4 Claims. (Cl. 260—78.5)

This invention relates to novel compositions of matter which are copolymers of dialkenyl sulfones and polymerizable monomers. Particularly it relates to copolymers of dialkenyl sulfones and polymerizable ethylenic unsaturated monomers which are homo-polymerizable or co-polymerizable in the presence of homo-polymerizable ethylenic unsaturated monomer. More particularly the invention pertains to improved lubricant compositions containing these novel copolymer compositions.

Within recent years it has become common practice to impart improved properties to lubricants through the use of various types of additives or addition agents. Lubricating oils employed in internal combustion engines such as automotive and diesel engines require the use of one or more addition agents to improve their serviceability under certain adverse operating conditions. Among the more important additives employed is the type which functions to prevent the formation and accumulation of sludge and varnish-like coatings on piston and cylinder walls of the engine. Such additives which have the property of maintaining clean engines are referred to as "detergent-type" addition agents. Other addition agents in common usage are known as "viscosity index improvers." These additives function to improve the viscosity-temperature characteristics of the lubricant in which they are employed, said relationship commonly being expressed in the art as the viscosity index of the oil.

I now have discovered that novel copolymers of dialkenyl sulfones and homopolymerizable ethylenic unsaturated monomers, copolymerized alone or in the presence of copolymerizable ethylenic unsaturated monomers having internal ethylenic unsaturation, give substantially improved viscosity index and detergency properties when these compounds are incorporated into lubricating oils. Further, I have discovered that when these copolymers are prepared in the presence of alkyl or aryl amines their properties in lubricating oils are additionally improved. In addition, these novel copolymers can be used in the formulation of coating compositions, adhesives, sealing compounds and as injection molding resins.

In accordance with my invention the novel copolymers of dialkylene sulfones and homopolymerizable ethylenically unsaturated monomers can be prepared under polymerizable conditions of about 100° C. to 250° C. in the presence of peroxide catalysts. The dialkenyl sulfones are prepared by methods which are well known to the art. As for example, divinyl sulfone can be prepared at room temperature, or a little above, by reacting 1 mol of sulfur dichloride with 2 mols of ethylene to give bis-(beta-chloroethyl) sulfide. The sulfide, in turn, is oxidized with hydrogen peroxide or nitric acid to give the bis(beta-chloroethyl) sulfone which, in turn, is treated with aqueous or alcoholic caustic to give divinyl sulfone. Other dialkenyl sulfones can be prepared in a similar manner. Although these dialkenyl sulfones will polymerize with themselves, the polymers produced by such homopolymerization are so highly cross linked and have such a molecular structure that they are not useful in my invention due to their insolubility in oil. In particular, to be useful as detergent additives and viscosity index improvers in lubricating oils, these copolymers must be obtained by linear polymerization rather than crosslinkage. Even a relatively small amount of crosslinking will cause oil insolubility.

In general, the monomers which will copolymerize with dialkenyl sulfones in accordance with this invention are characterized by having ethylenic unsaturation, that is, they contain non-aromatic

group. The monomers which are particularly suitable for copolymerization are those which are relatively reactive, i.e., those which are capable of forming homopolymers in accordance with the teachings of the prior art. The preferred monomers are those containing a terminal ethylenic group, i.e. a $CH_2=C-$ group, wherein at least one of the valence bonds is linked to a negative group, and the other bond is linked to a hydrogen or hydrocarbon groups. The preferred monomers may therefore be defined as vinylidene compounds (which term is intended to include vinyl compounds) wherein there is attached to the vinylidene group at least one negative group or radical such as an aryl group (for example, as in styrene, alpha-methylstyrene, chlorinated styrenes, 3-methyl styrene, 3,4,5-trimethyl styrene, etc.); an acyloxy group (vinyl acetate, vinyl butyrate, vinyl decanoate, vinyl octadecanoate, etc.); an alkoxy group (vinyl ethyl ether, vinyl butyl ether, vinyl decyl ether, vinyl octadecyl ether, etc.); an aroyloxy group (vinyl benzoate, vinyl toluate, etc.); a carbalkoxy group (butyl acrylate, butyl methacrylate, octyl acrylate, cetyl methacrylate, lauryl methacrylate, octadecyl acrylate, octdecyl methcrylate, etc.); a halogen radical (vinyl chloride, vinyl bromide, vinyl iodide, vinyl fluoride, vinylidene chloride, etc.); a cyano group (acrylonitrile, methacrylonitrile, etc.); a lactam group (N-vinyl pyrrolidone, N-vinyl piperidone, etc.).

The reactive monomers, i.e., those capable of forming homopolymers, can be used in admixture with other monomers containing internal ethylenic unsaturation which do not readily homopolymerize but which will copolymerize with a dialkenyl sulfone such as divinyl sulfone. The preferred compounds of this type are esters of butenedioic acids having the general formula

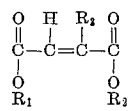

wherein the $R_1$ and $R_2$ represent the same or different alkyl radicals having from about 4 to about 22 carbon atoms, and preferably from about 6 to about 12 carbon atoms, and $R_3$ is selected from the group consisting of hydrogen and a methyl radical. Examples of such internally unsaturated compounds are dibutyl fumarate, diisooctyl fumarate, dilauryl fumarate, dioctadecyl fumarate and the corresponding esters of maleic, citraconic and mesaconic acids.

The dialkenyl sulfones which may be used for copolymerization with the admixture of reactive monomers and monomers containing internal ethylenic unsaturation defined above are the dialkenyl sulfones wherein the alkenyl group has 2 to 5 carbon atoms. The preferred dialkenyl sulfone is divinyl sulfone.

For use as lubricating oil additives the copolymers of this invention must be oil soluble. In order to achieve this end it is preferred that the polymerizable monomers used in conjunction with the dialkenyl sulfone each have from about 6 to 30 carbon atoms, and preferably about 10 to about 24 carbon atoms in the molecule. In any given case oil solubility can readily be increased by adjusting the ratio of the reactants so as to increase the proportion of the more soluble monomer in the copolymer, for example, the proportion of diisooctyl fumarate in a mixture of the same, styrene, and dialkenyl sulfone, or by increasing the chain length of the substituent hydrocarbon groups, for example, the ester group when an acrylate or methacrylate is used or the side chain when an alkyl styrene is used. Suitable mol ratios of dialkenyl sulfone to other monomers in the copolymer range from about 1:200 to about 1:1 and preferably from about 1:50 to about 1:6. From 1 to 12 weight percent, and preferably 3 to 6 weight percent, of the dialkenyl sulfone monomer is used in the total monomer mixture to obtain copolymers having a dialkenyl sulfone to other monomer ratio within the preferred range. It follows that the amount of vinylidene compound and internally unsaturated compound will be from 88 to 99 wt. percent of the total monomer mixture and preferably from 94 to 97 weight percent. When a mixture of vinylidene compounds and internally unsaturated compounds (e.g., butenedioic acid esters such as maleates or fumarates) is used, the mol ratio of the vinylidene compounds to the internally unsaturated monomers should be at least as great as 1:1 in order to insure the formation of a copolymer.

The copolymerization can be carried out by any of the methods known to the art, i.e. in bulk, in solution or in emulsion. Bulk and solution polymerization are preferred, however. A particularly useful expedient is solution polymerization in which the solvent is a lubricating oil similar to that in which the additive is to be used, e.g., an SAE 10 to SAE 30 base oil when the additive is to be used in an automotive crankcase oil. This procedure results in a concentrate of the additive in oil solution which requires no purification and which is easily handled and dispensed.

In preparing the copolymeric products of this invention there can be employed as a catalyst any compound which is capable of initiating polymerization by providing free radicals under the conditions of the reaction. Examples of such catalysts are peroxy compounds, for example, organic peroxides, peroxy salts, hydroperoxides, etc. such as di-t-butyl peroxide, benzoyl peroxide, cumene hydroperoxide, t-butylhydroperoxide, ethyl peroxy carbonate and the like, and compounds such as $\alpha,\alpha'$-azodiisobutyronitrile, dimethyl and diethyl $\alpha,\alpha'$-azodiisobutyrate, etc. Such initiators can be used in a concentration of about 0.1% to 1.0% by weight, preferably 0.1% to 0.5% by weight. In addition, polymerization may also be initiated by the use of ultraviolet light as well as by the use of heat alone.

In general, the range of polymerization reaction temperatures employed in producing the copolymers of the present invention varies between about 50° C. and 170° C. and is preferably within the range from about 100° C. to about 150° C. It will be understood that the polymerization temperature selected will usually be varied according to the nature and amount of the particular monomers and catalysts, if any, used and the desired polymerization pressure and the molecular weight of the products which are desired. Likewise, the time for polymerization will be dependent on similar factors and can range over a period from about one hour to about 60 hours, as will be apparent to one skilled in the art. When the preferred operating temperature of about 100° C. to 150° C. is employed I have found that suitable copolymers can generally be produced within a period of about 8 to 40 hours, which is accordingly the preferred range of polymerization times.

The copolymerization of the present invention can be effected at atmospheric or higher pressures. When a volatile comonomer is used, the process can be carried out under the autogenous pressure of the reaction mixture at the temperature employed. In most cases the preferred comoners (for example, styrene, acrylates and methacrylates, and vinyl esters and others) are sufficiently non-volatile at the preferred polymerization temperature of 100° C. to 150° C., that the use of pressures in excess of atmospheric will not be necessary, although they can be used if desired.

The above-described copolymers can be further improved for use in lubricating oils to improve viscosity index and detergency properties by including an organic amine with the monomers during the copolymerization step. Organic amines which may be added to the monomer mixture during copolymerization include aliphatic, aromatic, and araliphatic primary and secondary amines containing 1 to 48 carbon atoms. Useful amines in these classes are diethyl amine and mixtures of tertiary alkyl primary amines (principally t-$C_{12}H_{25}$ ($NH_2$ to t-$C_{14}C_{29}NH_2$). These amines can be added to the monomer mixture during copolymerization in 10 to 120% by weight of the dialkenyl sulfone used, preferably 40 to 80%. The nitrogen of the amine is incorporated into the copolymers and further improves their properties in lubricating oil, as hereinafter shown.

For use as lubricant additives the copolymers of the invention should have molecular weights within the range from about 10,000 to about 125,000 and preferably within the range from about 20,000 to about 70,000. Such copolymers can be used in lubricating oils in minor amounts or additive amounts, e.g. in concentrations of about 0.01% to about 10% by weight and preferably within the range from about 0.5% to about 5%. The use of greater or lesser amounts will be obvious to one skilled in this art.

The following examples are illustrative of my invention, and are not intended to be limiting.

EXAMPLE 1

A mixture of 26.6 ml. of styrene, 72.2 ml. of diisooctyl fumarate, 5.0 ml. of divinyl sulfone and 0.2 ml. of tertiary butyl hydroperoxide was heated for 16 hours at 110° C. A nearly quantitative yield of a very viscous brown copolymer was obtained. This copolymer was soluble in solvent-extracted mineral oil and contained 75.6% carbon, 10.0% hydrogen and 1.2% sulfur. Since the theoretical sulfur content would be 1.5%, this analysis indicates an essentially total incorporation of the divinyl sulfone into the copolymer.

EXAMPLE 2

The identical mixture of monomers as in Example 1 plus 2.59 ml. of diethyl amine were heated at 110° C. for 16 hours. This gave a nearly quantitative yield of a very viscous orange copolymer which was soluable in solvent-extracted mineral oil and analyzed 74.1% carbon, 9.8% hydrogen, 0.85% sulfur and 0.24% nitrogen. To indicate that essentially all of the diethyl amine and divinyl sulfone had reacted, the theoretical amount of nitrogen would be 0.37 and the theoretical amount of sulfur 1.1%.

EXAMPLE 3

The identical mixture of monomers as in Example 1 plus 7.05 ml. of a tertiary alkyl primary amine (principally t-$C_{12}H_{25}NH_2$ to t-$C_{14}H_{29}NH_2$) were heated at 110° C. for 16 hours, giving a nearly quantitative yield of a very viscous, orange copolymer which was soluble in solvent-extracted mineral oil and analyzed 72.7% carbon, 11.6% hydrogen, 1.5% sulfur and 0.43% nitrogen.

EXAMPLE 4

A mixture of 80 ml. n-lauryl methacrylate, 5 ml. divinyl sulfone and 0.2 ml. t-butyl hydroperoxide was heated at 110° C. for 16 hours and gave a nearly quantitative yield of a very viscous, light brown copolymer which was soluble in solvent-extracted mineral oil and analyzed 74.2% carbon, 11.7% hydrogen and 1.2% sufur.

EXAMPLE 5

The identical mixture of monomers as in Example 4 plus 2.59 ml. of diethyl amine were heated at 110° C. for 16 hours, giving a nearly quantitative yield of a very viscous, light brown copolymer soluble in solvent-extracted mineral oil and analyzed 74.1% carbon, 11.5% hydrogen, 0.9% sulfur and 0.2% nitrogen.

EXAMPLE 6

The identical mixture of monomers as in Example 4 plus 7.05 ml. of a tertiary alkyl primary amine (principally t-$C_{12}H_{25}NH_2$ to t-$C_{14}H_{29}NH_2$) were heated at 110° C. for 16 hours, giving a nearly quantitative yield of a viscous, light brown copolymer which was soluble in solvent-extracted mineral oil and analyzed 72.9% carbon, 9.6% hydrogen, 1.4% sulfur and 0.4% nitrogen.

The polymeric products of Examples 1 to 6 were tested for their effectiveness as viscosity index improvers in a concentration of 2% by weight in a solvent-extracted SAE5 mineral oil base. The results are given in the following Table 1.

*Table 1*

| Additive: | Viscosity index |
|---|---|
| None | 85 |
| Product of Example 1 | 120 |
| Product of Example 2 | 127 |
| Product of Example 3 | 127 |
| Product of Example 4 | 107 |
| Product of Example 5 | 114 |
| Product of Example 6 | 111 |

The effectiveness of the copolymers of the present invention in improving the detergency characteristics of lubricating oils was demonstrated by the carbon suspension test. This carbon suspension test (C. B. Biswell et al., Ind. Eng. Chem. 47, 1598, 1601 (1955)) is conducted by adding 0.5% concentration of the polymer to be tested to 70 cc. of kerosene with three grams of a paste containing 20% carbon black in a heavy white oil base, stirring the mixture five minutes in a 100 cc. graduate in a Herschel demulsibility tester at room temperature (25° C.) The settling time of the carbon black or charcoal was observed and recorded at different time intervals, as indicated in Table 2 below:

*Table 2*

| Additive | Percent charcoal settled | Time |
|---|---|---|
| Product of Example 1 | 10 | 2 hours. |
|  | 25 | 4 hours. |
|  | 90 | 12 hours. |
| Product of Example 2 | 0 | 3 weeks. |
| Product of Example 3 | 0 | 3 weeks. |
| Product of Example 4 | 10 | 2 hours. |
|  | 20 | 4 hours. |
|  | 90 | 20 hours. |
| Product of Example 5 | 0 | 3 weeks. |
| Product of Example 6 | 0 | 3 weeks. |

It can be seen from Tables 1 and 2 that the copolymers of the dialkenyl sulfones and the polymerizable monomers of this invention are effective viscosity index improvers and impart detergent properties to mineral lubricating oils. In addition, if an amine is included in the mixture as it is polymerized, the product imparts additional improved viscosity index and detergency properties to the lubricating oil. In Table 1 when no additive was used in the lubricating oil, viscosity index was 85 but when the copolymers of Examples 1 through 6 were added, about 20 to 40 viscosity index number improvement was obtained. This improvement was obtained whether the amine was included with the copolymer or not. However, as shown in Table 2, the copolymers of this invention which were copolymerized in the presence of an amine (Examples 2, 3, 5 and 6) gave detergent properties as shown by the charcoal suspension test superior to those which contained no amine. By way of comparison, the copolymers of styrene and diisooctyl fumarate and the homopolymer of nonyl lauryl methacrylate at the 2% concentration in kerosene showed 100% settling in less than 2 hours. Thus, even though the copolymers incorporating divinyl sulfone have detergency ability, this property is tremendously increased if the copolymer contains an amine as well as the divinyl sulfone.

The products of this invention can be used in lubricating oils in concentrations of from about 0.01% to about 10% and preferably from about 0.5% to about 5% by weight. Although the present invention has been illustrated by the use of these products in mineral lubricating oils it is not restricted thereto. Other lubricating oil bases can be used, such as hydrocarbon oils, both natural and synthetic, for example, those obtained by the polymerization of olefins, as well as synthetic lubricating oils of the alkylene oxide type and the polycarboxylic acid ester type, such as the oil soluble esters of adipic acid, sebacic acid, azelaic acid, etc. It is also contemplated that various other well known additives such as antioxidants, antiforming agents, pour point depressors, extreme pressure agents, antiwear agents, etc., may be incorporated in lubricating oils containing the additives of my invention.

Addition agent concentrates of a suitable oil base containing more than 10%, for example up to 50% or more, of the copolymers of this invention alone or in combination with other additives can be used for blending with hydrocarbon oils or other oils in the proportions desired for the particular conditions of use to give a finished product containing from about 0.01% to about 10% of the copolymers of this invention.

Unless otherwise stated, the percentage given herein and in the claims are percentages by weight.

While I have described my invention by references to specific embodiments thereof, the same are given by way of illustration only. Modifications and variations will be apparent from my description to those skilled in the art.

I claim:

1. An oil-soluble copolymer of a dialkenyl sulfone wherein said alkenyl group has from 2 to 5 carbon atoms, a polymerizable vinyl compound, a dialkyl diester of butenedioic acid having from 4 to 22 carbon atoms in each alkyl group, and an organic amine, said organic amine containing from 1 to 48 carbon atoms and selected from at least one member of the class consisting of primary and secondary amines, said copolymer having a molecular weight of about 10,000 to 125,00; said dialkenyl sulfone being present in an amount of from about 1 to 12 percent by weight of said copolymer, said polymerizable vinyl compound and said ester making up a major portion of said copolymer, said vinyl compound being present in at least an equal amount to that of said ester, and said organic amine being present in an amount of from 10 to 120 percent of said dialkenyl sulfone.

2. The oil-soluble copolymer of claim 1 wherein said dialkenyl sulfone is divinyl sulfone, said vinyl compound is styrene and said ester of butenedioic acid is diisooctyl fumarate.

3. The oil-soluble copolymer of claim 2 wherein said organic amine is diethyl amine.

4. The oil-soluble copolymer of claim 2 wherein said organic amine is a mixture of tertiary alkyl primary amines containing from 12 to 14 carbon atoms in the alkyl group.

References Cited by the Examiner

UNITED STATES PATENTS

| | | | |
|---|---|---|---|
| 2,691,644 | 10/1954 | Roth | 260—79.3 |
| 2,731,426 | 1/1956 | Lane | 260—79.3 |
| 2,793,999 | 5/1957 | Dietrich et al. | 252—47.5 |
| 2,796,404 | 6/1957 | Levin | 252—47.5 |
| 2,985,625 | 5/1961 | Jones | 260—78.5 |

FOREIGN PATENTS 586,457  3/1947  Great Britain.

OTHER REFERENCES

Norrish et al.: Royal Society of Art (Proceedings), London, pp. 205–220, pages 212–213 particularly relied on.

R. G. W. Norrish and E. F. Brookman: Proc. Roy. Soc. A. 163, 205, 1937, pages 212–213 relied on.

JOSEPH L. SCHOFER, *Primary Examiner*.

J. GREENWALD, M. LIEBMAN, D. CZAJA,
*Examiners.*